United States Patent
Stoller et al.

(10) Patent No.: US 10,690,802 B2
(45) Date of Patent: Jun. 23, 2020

(54) CEMENT EVALUATION USING NEUTRON TOOL

(71) Applicant: Schlumberger Technology Corporation, Sugar Land, TX (US)

(72) Inventors: Christian Stoller, Sugar Land, TX (US); Alice Chougnet-Sirapian, Clamart (FR); Mauro Manclossi, Clamart (FR); Marie-Laure Mauborgne, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/658,654

(22) Filed: Jul. 25, 2017

(65) Prior Publication Data

US 2019/0033484 A1 Jan. 31, 2019

(51) Int. Cl.
*G01V 5/10* (2006.01)
*G01B 15/02* (2006.01)
(Continued)

(52) U.S. Cl.
CPC .............. *G01V 5/101* (2013.01); *E21B 33/14* (2013.01); *E21B 47/0002* (2013.01); *E21B 47/0005* (2013.01); *G01B 15/02* (2013.01)

(58) Field of Classification Search
CPC ...... E21B 47/00; E21B 47/0005; E21B 33/14; E21B 47/1015; E21B 47/0002;
(Continued)

(56) References Cited

U.S. PATENT DOCUMENTS 4,731,531 A    3/1988   Handke
4,788,424 A * 11/1988   Preeg ..................... G01V 5/101
                                                250/262

(Continued)

FOREIGN PATENT DOCUMENTS

EP            0443936 A1    8/1991
WO    WO 2015102574 A1 * 7/2015   ......... E21B 47/0005

OTHER PUBLICATIONS

International Search Report and written opinion issued in the related PCT Application No. PCT/US2017/052854 dated Jan. 31, 2018 (12 pages).

*Primary Examiner* — Taeho Jo

(57) ABSTRACT

A method for evaluating cement in a cased wellbore in a geological formation includes placing a downhole tool into the cased wellbore, where the cased wellbore has been cased using a cement that contains a particular material. The method includes emitting neutrons using the downhole tool, wherein the neutrons interact with the particular material via inelastic scattering or capture of neutrons and cause the material to emit an energy spectrum of the gamma rays associated with the material or wherein the time-based measurement of gamma rays or neutrons is influenced by the presence of the material. The method includes using the downhole tool to detect radiation radiation, such as the energy spectrum of the gamma rays, or a die-away pattern of the gamma rays or neutrons that indicates a presence of the particular material and enable to estimate a parameter of the cement.

6 Claims, 11 Drawing Sheets

(51) Int. Cl.
*E21B 47/00* (2012.01)
*E21B 33/14* (2006.01)

(58) Field of Classification Search
CPC .......... G01V 5/101; G01V 5/107; G01V 5/06; G01B 15/02
USPC ...................................................... 250/269.7
See application file for complete search history.

(56) References Cited

U.S. PATENT DOCUMENTS

| | | | |
|---|---|---|---|
| 5,525,797 A * | 6/1996 | Moake | G01V 5/12 |
| | | | 250/269.3 |
| 5,627,368 A * | 5/1997 | Moake | G01V 5/12 |
| | | | 250/266 |
| 5,783,822 A * | 7/1998 | Buchanan | C04B 22/00 |
| | | | 250/259 |
| 6,691,780 B2 | 2/2004 | Nguyen et al. | |
| 6,703,606 B2 | 3/2004 | Adolph | |
| 6,781,115 B2 | 8/2004 | Stoller et al. | |
| 8,100,177 B2 | 1/2012 | Smith, Jr. et al. | |
| 8,637,806 B2 | 1/2014 | Kwong et al. | |
| 8,964,504 B2 * | 2/2015 | Chace | G01V 5/101 |
| | | | 250/269.4 |
| 9,006,645 B2 | 4/2015 | Kwong et al. | |
| 9,885,802 B2 * | 2/2018 | Chace | G01V 5/101 |
| 2006/0243898 A1 * | 11/2006 | Gilchrist | G01V 5/101 |
| | | | 250/269.7 |
| 2009/0087911 A1 | 4/2009 | Ramos | |
| 2009/0210161 A1 * | 8/2009 | Duenckel | G01V 5/101 |
| | | | 702/8 |
| 2011/0001040 A1 * | 1/2011 | Smith, Jr. | G01V 5/107 |
| | | | 250/264 |
| 2012/0075953 A1 * | 3/2012 | Chace | E21B 47/0005 |
| | | | 367/35 |
| 2013/0345983 A1 * | 12/2013 | Guo | G01V 5/104 |
| | | | 702/8 |
| 2014/0034823 A1 * | 2/2014 | Hyde-Barber | C04B 28/02 |
| | | | 250/269.4 |
| 2014/0374582 A1 * | 12/2014 | Guo | G01V 5/125 |
| | | | 250/269.3 |
| 2015/0124921 A1 | 5/2015 | Groves et al. | |
| 2015/0144340 A1 | 5/2015 | Surjaatmadja et al. | |
| 2015/0185362 A1 | 7/2015 | Kwong et al. | |
| 2016/0024909 A1 * | 1/2016 | Han | E21B 47/1015 |
| | | | 166/250.1 |
| 2016/0238736 A1 * | 8/2016 | Guo | E21B 47/0005 |
| 2016/0291198 A1 * | 10/2016 | Lee | G01V 5/125 |
| 2016/0326865 A1 * | 11/2016 | Zhang | E21B 47/0005 |
| 2017/0167243 A1 * | 6/2017 | Guo | G01N 23/05 |
| 2017/0218749 A1 * | 8/2017 | Lee | G21K 1/02 |
| 2018/0087376 A1 * | 3/2018 | Rasmus | E21B 47/1015 |
| 2018/0172876 A1 * | 6/2018 | Inanc | G01V 5/045 |
| 2018/0188412 A1 | 7/2018 | Beekman et al. | |
| 2019/0004205 A1 * | 1/2019 | Lee | G01V 5/12 |

* cited by examiner

| RATIO | | SHALLOW / MEDIUM | | FAR / MEDIUM | | FAR / SHALLOW | |
|---|---|---|---|---|---|---|---|
| | | TOTAL | LATE COUNT | TOTAL | LATE COUNT | TOTAL | LATE COUNT |
| PRODUCTION | Σ~20 | 0.12 | 0.023 | 0.018 | 0.036 | 0.15 | 1.52 |
| | Σ~80 | 0.13 | 0.017 | 0.017 | 0.040 | 0.13 | 2.45 |
| | DIFFERENCE | +8% | -26% | -6% | +11% | -13% | +60% |
| SURFACE | Σ~20 | 0.12 | 0.028 | 0.013 | 0.030 | 0.11 | 1.06 |
| | Σ~80 | 0.14 | 0.009 | 0.011 | 0.059 | 0.08 | 6.81 |
| | DIFFERENCE | +17% | -70% | -15% | +100% | -27% | +500% |

*FIG. 10*

CEMENT EVALUATION USING NEUTRON TOOL

BACKGROUND

This disclosure relates to systems and methods to evaluate cement behind a casing of a wellbore using a downhole tool (e.g., a neutron tool including a neutron source, such as a neutron generator).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A wellbore drilled into a geological formation may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with another zone. This desirable condition is referred to as "zonal isolation." Yet, well completions may not go as planned. For example, the cement may not set as planned and/or the quality of the cement may be less than expected. In other cases, the cement may unexpectedly fail to set above a certain depth due to natural fissures in the formation.

Acoustic downhole tools are often used to identify whether the cement has been properly installed. For example, an acoustic downhole tool may be placed into the wellbore. The acoustic downhole tool may emit an acoustic signal toward the casing. The acoustic signal impacts the casing, causing the casing to produce an acoustic response signal, which varies depending on the acoustic impedance of the material on the other side of the casing. The acoustic response signal may indicate that a solid is on the other side of the casing when relatively heavy cement is properly installed behind the casing. Increasingly, however, lighter rather than heavier cements are being used to complete wells. These may be difficult to detect using some acoustic downhole tools. Moreover, in addition to acoustic downhole tools, other well logging tools may be used to assess well properties.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method for evaluating cement in a cased wellbore in a geological formation includes placing a downhole tool into the cased wellbore, where the cased wellbore has been cased using a cement that contains a particular material. The method includes emitting neutrons using the downhole tool, wherein the neutrons interact with the particular material via inelastic scattering or capture of neutrons and cause the material to emit an energy spectrum of the gamma rays associated with the material, or wherein the time-based measurement of gamma rays or neutrons is influenced by the presence of the material. The method includes using the downhole tool to detect prompt radiation from inelastic or capture interactions or delayed radiation resulting from activation, where the measurement of radiation comprises the energy spectrum of the gamma rays that indicates a presence of the particular material or a die-away pattern of the capture gamma rays or the neutrons that indicates a presence of the particular material. The measurement of radiation enables a parameter of the cement to be estimated based on the measurement of the energy spectra of the gamma rays or the die-away spectrum of the capture gamma rays or the neutrons.

In another example, a method includes installing a casing into a wellbore in a geological formation, and placing a cement slurry into an annulus formed between the casing and a wall of the wellbore. The cement slurry includes a particular material that emits radiation in response to interactions with neutrons emitted by a downhole neutron tool, thereby allowing the cement to be measured via well logging using the downhole neutron tool.

In another example, a downhole testing system includes a downhole neutron tool configured to be moved into a wellbore in a geological formation, where the downhole acquisition tool includes one or more neutron generators, one or more radiation detectors, and one or more non-transitory, tangible computer-readable media storing instructions. The instructions receive neutron well-logging measurements obtained by the downhole neutron tool over a depth interval of a well and determine one or more signals representative of an indication of a quantity of cement surrounding a casing in the depth interval of the well.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 illustrates a table of values obtained from a neutron detector at varying depths of investigation, in accordance with an embodiment;

DETAILED DESCRIPTION

Figure 1:
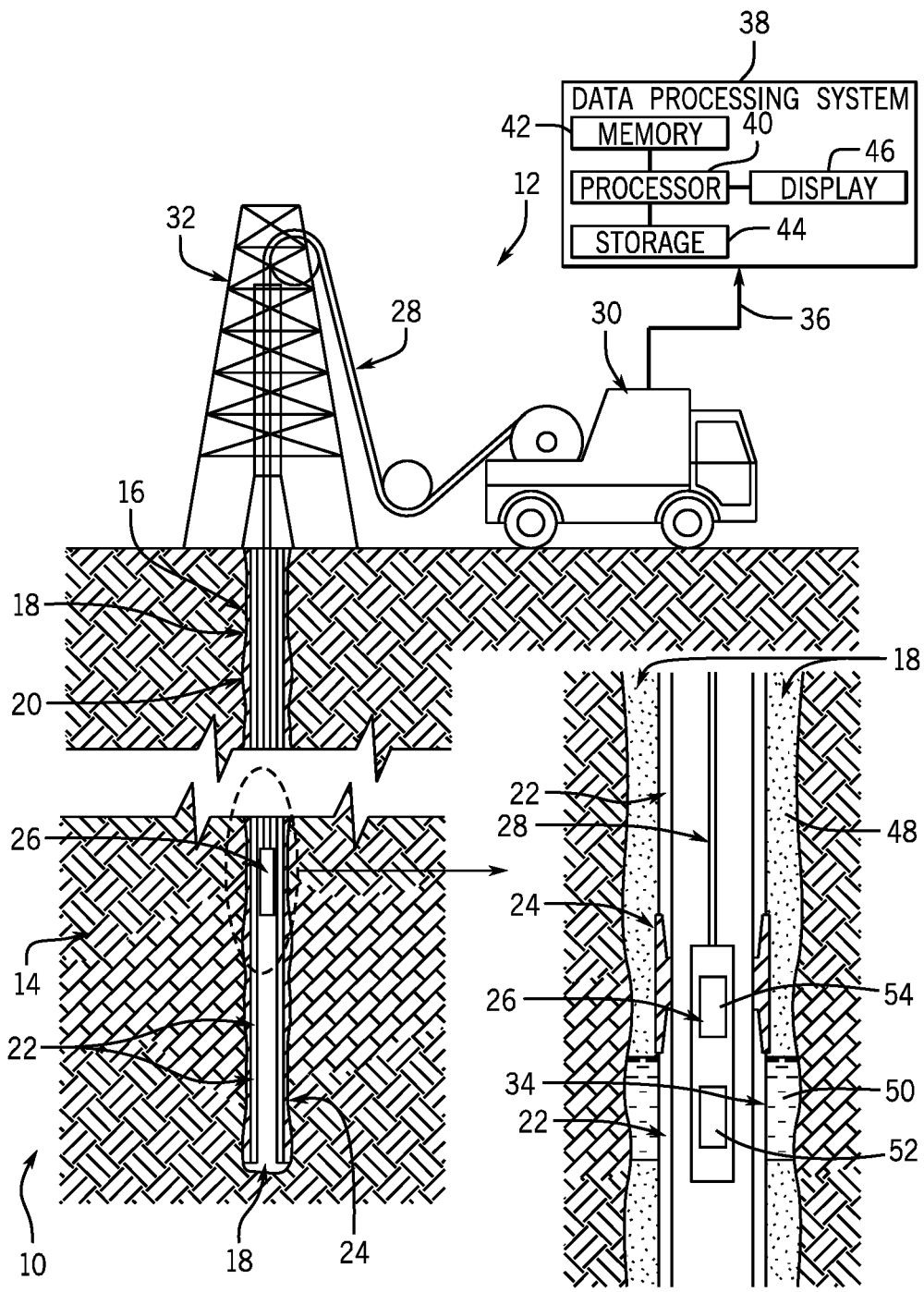
FIG. 1 is a schematic diagram of a system for verifying proper cement installation and/or zonal isolation of a well, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, metal casing may be installed inside the well and cement placed into the annulus between the casing and the wellbore. When the cement sets, fluids from one zone of the geological formation may not be able to pass through the annulus of the wellbore to interact with another zone. This desirable condition is referred to as "zonal isolation." Proper cement installation may also ensure that the well produces from targeted zones of interest. To verify that the cement has been properly installed and that the cement has remained in a desired state, this disclosure teaches systems and methods for cement evaluation by analyzing well-logging data from a downhole neutron tool. Namely, the cement may include a concentration of any suitable material—not ordinarily found in that concentration in the materials around the well—that the neutrons interact with to produce a radiation signal (e.g., a characteristic radiation) in response. Detecting the characteristic radiation signal using a downhole neutron tool thus may be used to detect the cement.

For example, the cement may include boron that is added as a dopant or that is naturally present in the cement that is poured in an annular space around the casing between the casing and the wellbore. The term "cement" as defined herein may be defined as the cement slurry poured in the annular space between the casing and the wellbore. The cement may include any suitable cement for cementing operations including hydraulic sealing, zonal isolation, structural casing support, etc., that utilize a concentration of a suitable dopant as described herein. The concentration of the dopant in the cement, such as boron, may be different from that of the geological formation where the well is drilled. When bombarded by neutrons from a downhole neutron tool, the boron in the cement may emit gamma rays through a process known as neutron capture. In the presence of dopant, the neutron population decreases faster with time and, as a consequence, the quantity of gamma rays emitted decreases also monotonically with the neutron population. The neutron-capture gamma rays that result have a particular energy spectrum that indicates the presence of the dopant. Thus, the characteristic gamma ray spectrum due to the one or more dopants may be used as a proxy for detecting the cement. Detecting the characteristic gamma ray spectrum due to the dopants may indicate the presence or absence cement.

These neutron well-logging data may be used in combination with acoustic impedance data that may be obtained from one or more acoustic downhole tools. For example, regulatory specifications that pertain to certain cement systems (e.g., light cement systems) may specify the use of multiple types of data measurements to evaluate cement systems.

With this in mind, FIG. 1 schematically illustrates a system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluids.

The surface equipment 12 may carry out various well logging operations to detect conditions of the wellbore 16.

The well logging operations may measure parameters of the geological formation 14 (e.g., resistivity or porosity) and/or the wellbore 16 (e.g., temperature, pressure, fluid type, or fluid flowrate). Other measurements may provide well-logging data relating to cement characteristics (e.g., measurements of characteristic radiation emitted by a material in the cement of the annular fill 18, such as boron or gadolinium added to the cement as a dopant, in response to interaction with neutrons emitted from one or more neutron generators disposed in a downhole tool) that may be used to verify the cement installation and the zonal isolation of the wellbore 16. One or more downhole neutron tools 26 may obtain some of these measurements.

The example of FIG. 1 shows the downhole neutron tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the downhole neutron tool 26 may be conveyed using any other suitable conveyance, such as coiled tubing. The downhole neutron tool 26 may be used to obtain measurements of radiation emitted by a material (e.g., a dopant such as boron or gadolinium) in response to neutrons emitted from a neutron generator—52 or a radio-isotopic neutron source disposed in the tool 26. The downhole neutron tool 26 may include one or more radiation detectors 54. The radiation detectors 54 may detect neutrons that scatter and return to the downhole neutron tool 26 and/or gamma rays generated from neutron interactions. The radiation detectors 54 may be placed at various distances from the neutron generator 52 to gather data about the neutrons and/or gamma rays at various depths of investigation (e.g., near, medium, deep) as explained further below. The data gathered by the radiation detectors 54 may be analyzed in order to obtain a number of neutron capture gamma rays or thermal neutrons due to thermal neutron interactions with the material (e.g., a dopant such as boron or gadolinium). The data may then be used to determine the amount of the material present surrounding the wellbore to subsequently determine the presence or absence of cement. Still further, the data may be used to determine the thickness of the cement over the depth of the well at various depths based in part on the data (e.g., the detected radiation, number of neutron capture gamma rays, etc.).

The downhole neutron tool 26 may be deployed inside the wellbore 16 by the surface equipment 12, which may include a vehicle 30 and a deploying system such as a drilling rig 32. Data related to the geological formation 14 or the wellbore 16 gathered by the downhole neutron tool 26 may be transmitted to the surface, and/or stored in the downhole neutron tool 26 for later processing and analysis. The vehicle 30 may be fitted with or may communicate with a computer and software to perform data collection and analysis.

FIG. 1 also schematically illustrates a magnified view of a portion of the cased wellbore 16. As mentioned above, the downhole neutron tool 26 may obtain well-logging data relating to the presence of the cement in the annular fill 18 behind the casing 22. For instance, the downhole neutron tool 26 may obtain measures of well-logging data, which may be used to determine where the material behind the casing 22 is fully cemented or at least partly washed out. When the downhole neutron tool 26 provides such measurements to the surface equipment 12 (e.g., through the cable 28), the surface equipment 12 may pass the measurements as well-logging data 36 to a data processing system 38 that includes a processor 40, memory 42, storage 44, and/or a display 46. In other examples, the well-logging data 36 may be processed by a similar data processing system 38 at any other suitable location. The processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the well-logging data 36 from the acoustic logging tool 26 may be used to determine whether cement of the annular fill 18 has been installed as expected. In some cases, the well-logging data 36 may indicate that the cement of the annular fill 18 is present (e.g., as indicated at numeral 48), as indicated by the presence of the expected radiation caused by neutron interactions with the cement (e.g., characteristic neutron-capture gamma rays from boron or gadolinium in the cement). In other cases, the well-logging data 36 may indicate the potential absence of cement in the annular fill 18 (e.g., as indicated at numeral 50), as indicated by the absence of the expected radiation caused by neutron interactions with the cement (e.g., characteristic neutron-capture gamma rays from boron or gadolinium in the cement). For example, when the well-logging data 36 indicates that the annular fill 18 lacks the radiation that is expected to be detected when the cement is present, this may imply that the cement is either absent or was of the wrong type or consistency, and/or that fluid channels have formed in the cement of the annular fill 18. The well-logging data 36 may also be used to determine the thickness of the cement in the annular space. For example, the thickness of the annular fill 18 may utilize pre-fill measurements taken via calipers or other suitable tools to measure the wellbore thickness. The pre-fill measurements may then be compared to post-fill measurements after the annular space is filled with cement. The pre-fill and post-fill measurements may be used to determine whether the thickness of the cement is a suitable thickness, detect abnormalities in the cement, and/or make adjustments to the cementing operations.

Figure 2:
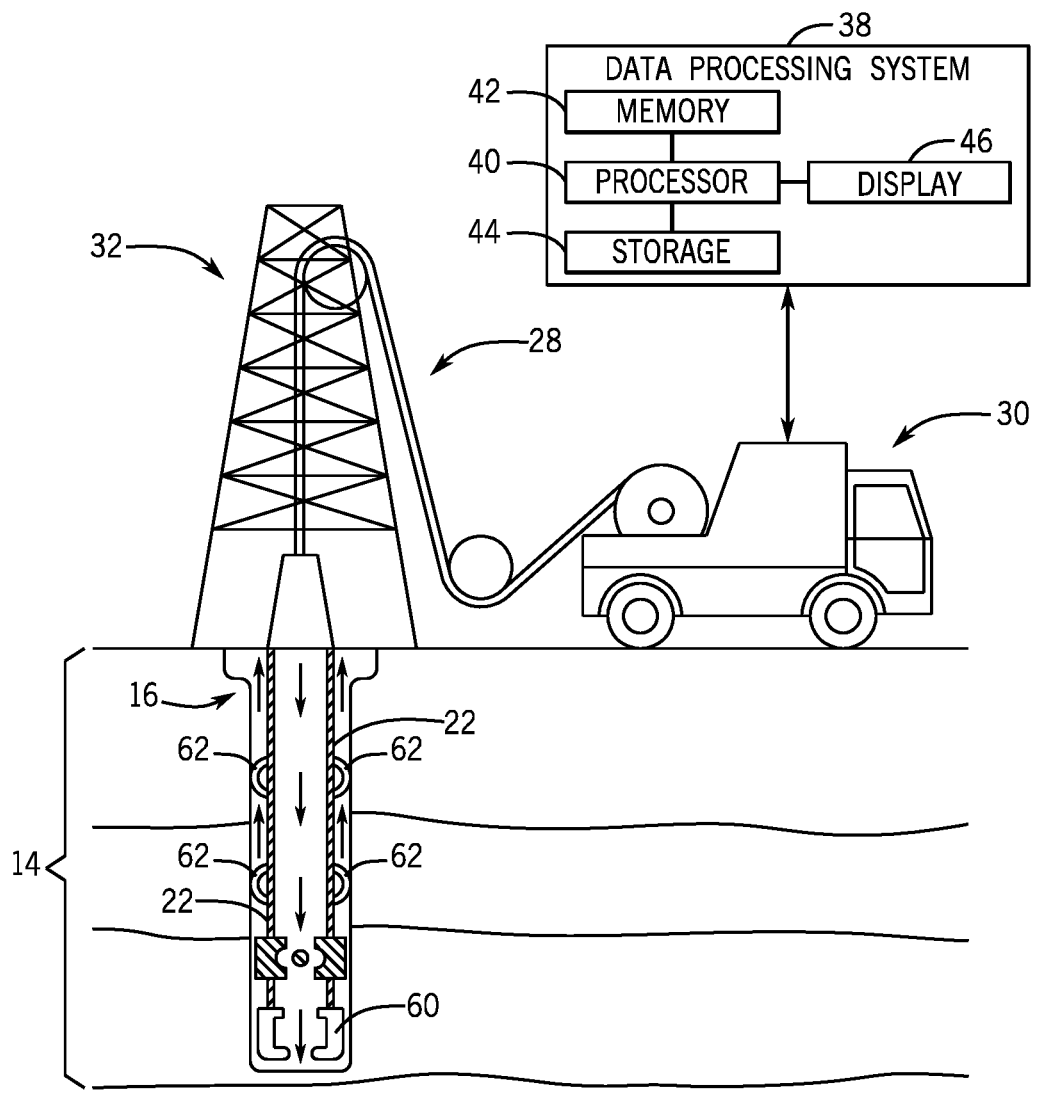
FIG. 2 is a schematic diagram of a system for placing cement within an annular space of the well, in accordance with an embodiment.

FIG. 2 schematically illustrates a system for placing cement within an annular space of a well. In particular, FIG. 2 illustrates the surface equipment 12 above the geological formation 14. In the example of FIG. 2, a drilling operation has previously been carried out to drill the wellbore 16. Within the wellbore 16, the casing 22 may be positioned. Between the casing 22 and the formation 14, cement may be injected into the annular space to create the annular fill 18 between the casing 22 and the geological formation 14. As mentioned above, the cement may include a naturally occurring or added material that produces characteristic radiation when bombarded by neutrons. For example, boron or gadolinium may be added as a dopant to the cement. This may cause the cement to emit characteristic gamma rays through neutron capture events when the cement is bombarded by neutrons. By detecting these characteristic gamma rays, the downhole neutron tool 26 may identify whether the cement is present in the annular fill 18 behind the casing 22.

The annular fill 18 may provide a hydraulic seal that establishes zonal isolation that may prevent fluid communication between producing zones within the wellbore 16 and may block the escape of fluids to the surface. The annular fill 18 may also anchor and support the casing 22 and protect against corrosion due to contact with formation fluids.

The bottom end of the casing 22 may include a shoe 60. The shoe 60 may be a guide shoe or a float shoe. In either case, the shoe 60 may be a device that guides the casing 22 toward the center of the wellbore 16 to minimize contact with rough edges or washouts during installation. In addition, centralizers 62 may be placed within the annulus space to prevent the casing 22 from sticking while it is lowered into the wellbore 16. The centralizers 62 also help keep the casing 22 in the center of the wellbore 16 to help ensure placement of a uniform cement sheath in the annulus space.

Generally, when the casing 22 is initially placed within the wellbore 16, the interior of the casing 22 may fill with drilling fluid that may be present after the wellbore 16 has been drilled. As such, a cementing operation includes removing the drilling fluid from the interior of the casing 22, placing a cement slurry in an annulus, and filling the interior of the casing 22 with a displacement fluid, such as a drilling fluid, brine, or water.

In addition to the material disposed within the wellbore 16, the surface equipment 12 may carry out a cement installation operation, various well logging operations to detect conditions of the wellbore 16, and the like. As used herein, the cement operation may generally refer to the process of pumping cement into the wellbore 16 to form an annular ring of cement between the casing 22 and the geological formation 14. In one example, the surface equipment 12 may include equipment that store cement slurries, drilling fluids, displacement fluids, spacer fluids, chemical wash fluids, and the like. The surface equipment 12 may include piping and other materials used to transport the various fluids described above into the wellbore 16. The surface equipment 12 may also include pumps and other equipment (e.g., batch mixers, centrifugal pumps, liquid additive metering systems, tanks, etc.) that may fill in the interior of the casing 22 with the fluids discussed above.

After the cement slurry is placed within the annulus space, the cement slurry may take time to cure. The cured cement may then be evaluated using the downhole neutron tool 26 and/or another downhole tool (e.g., an acoustic downhole tool) to ensure that the cement placed within the annulus space is robust and capable of maintaining a threshold stress between the casing 22 and the geological formation 14. That is, after the cement has set, the cement should withstand stress and be a hydraulics barrier to prevent any formation fluid (e.g., gas) flow through the cement. In addition, the cement slurry that is placed in the annulus space may be evaluated before the cement slurry sets. By evaluating the cement slurry before it has cured, remedial techniques may be used to adjust the cement slurry before it sets.

In some embodiments, the cement operation may be controlled by the data processing system 38. The data processing system 38 may control the cement operation described above including the operation of the pumps, the placement of cement plugs, the switching between various fluids, and the like. In addition, the data processing system 38 may evaluate the integrity of the cement annular ring after the cement operation is completed. Additionally, the data processing system 38 or any other suitable computing device may perform a design workflow or simulation of the cement operation prior to placing the cement within the wellbore 16.

Figure 3:
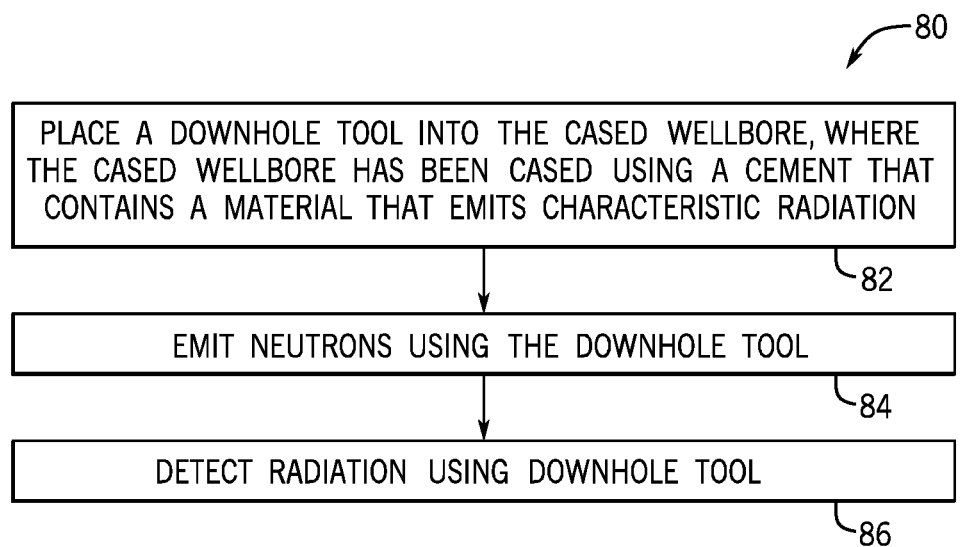
FIG. 3 illustrates a flowchart of a method for evaluating cement in the cased wellbore in the geological formation, in accordance with an embodiment.

FIG. 3 illustrates a flowchart of a method 80 for evaluating cement in the cased wellbore 16 in the geological formation 14, in accordance with an embodiment. The method 80 may include positioning (block 82) the downhole tool 26 into the cased wellbore 16. As described above, the cased wellbore 16 may be cased with cement containing a material (e.g., a dopant such as boron or gadolinium). The material may emit a specific gamma ray spectrum when bombarded with neutrons, which may be used to determine the absence or presence of cement, as explained further below.

The method 80 may include using a neutron source 52 disposed in the downhole tool 26 to emit (block 84) neutrons. The emitted neutrons may interact with the material and cause the material to emit a radiation (e.g., a spectrum of gamma rays associated with the material, a die-away pattern of the gamma rays or neutrons) due to high energy (inelastic), epithermal or thermal neutron interactions. For example, inelastic scattering or neutron capture gamma rays may be emitted by the material in the cement. These gamma rays may be identifiable as deriving from the material in the cement, as opposed to other downhole materials. For example, the material (e.g., boron or gadolinium) may be less likely to be found in the geological formation 14 or may be found in a different concentration in the geological formation 14 than in the cement (e.g., the material may be found in a low enough concentration in the geological formation 14 to distinguish the cement from the geological formation 14).

The method 80 may include using a radiation detector 54 to detect (block 86) well-logging data, such as the characteristic radiation associated with the material (e.g., a dopant such as boron or gadolinium). The well-logging data may then be used to determine the amount of the material present surrounding the wellbore to subsequently determine the presence or absence of cement and/or the thickness of the cement, as described in further detail below.

Figure 4:
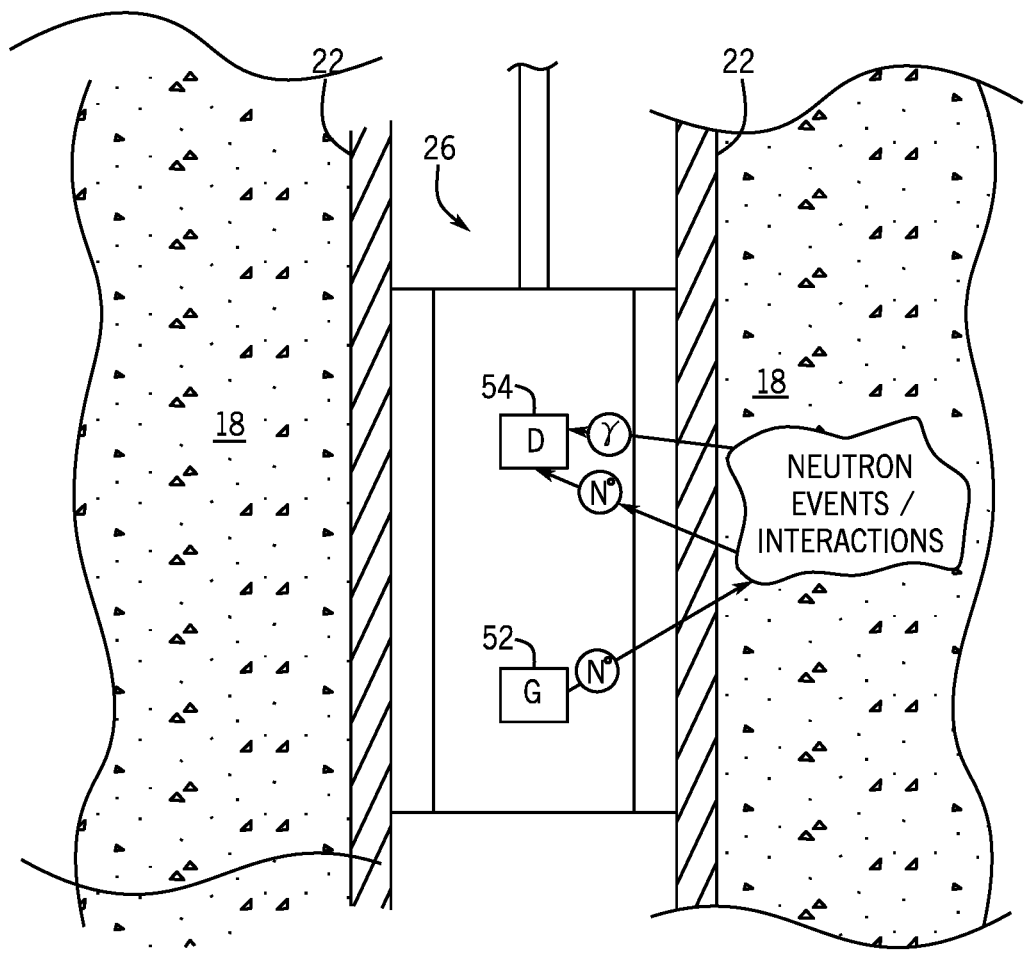
FIG. 4 is a block diagram of a downhole tool (e.g., a neutron tool) used to obtain well-logging data relating to material behind casing of the well, in accordance with an embodiment.

FIG. 4 is a block diagram of the downhole neutron tool 26 used to obtain well-logging data relating to material behind casing 22 of the well, in accordance with an embodiment. Specifically, a neutron source (e.g., the neutron source 52) in the downhole neutron tool 26 may emit neutrons out toward the casing 22. The neutrons may be transported to interfaces at the casing 22, the annular fill 18, and the geological formation 14 or an outer casing, respectively. The interactions (e.g., elastic and inelastic collisions, capture, etc.) of the neutrons may vary depending on whether the annular fill 18 is of the generally solid character 48 or the generally liquid or gas character 50, due to the composition, density, and other properties of the fluid. Indeed, even if the annular fill 18 is of the generally liquid or gas character 50, but contains cement (detectable via the characteristic behavior of the cement when interacting with neutrons), the annular fill 18 is likely to set into the generally solid character 48 in time. The neutron source 52 may be used for time based measurements (e.g., using a pulsed neutron generator) and/or energy based measurements (e.g., using a radioisotope source, a pulsed neutron generator, etc.). The radiation detector 54 may be a gamma ray and/or a neutron detector that may detect the radiation that results from these neutron interactions. The downhole neutron tool 26 may use any suitable number of different data analysis techniques, including utilizing measurements of the detected radiation, number of neutron capture gamma rays, etc. Various measurements obtained at the same depth in the wellbore 16 may be correlated to gain insight into the properties of the material behind the casing 22. An example of the measurements obtained may be further understood with reference to FIG. 5.

Figure 5:
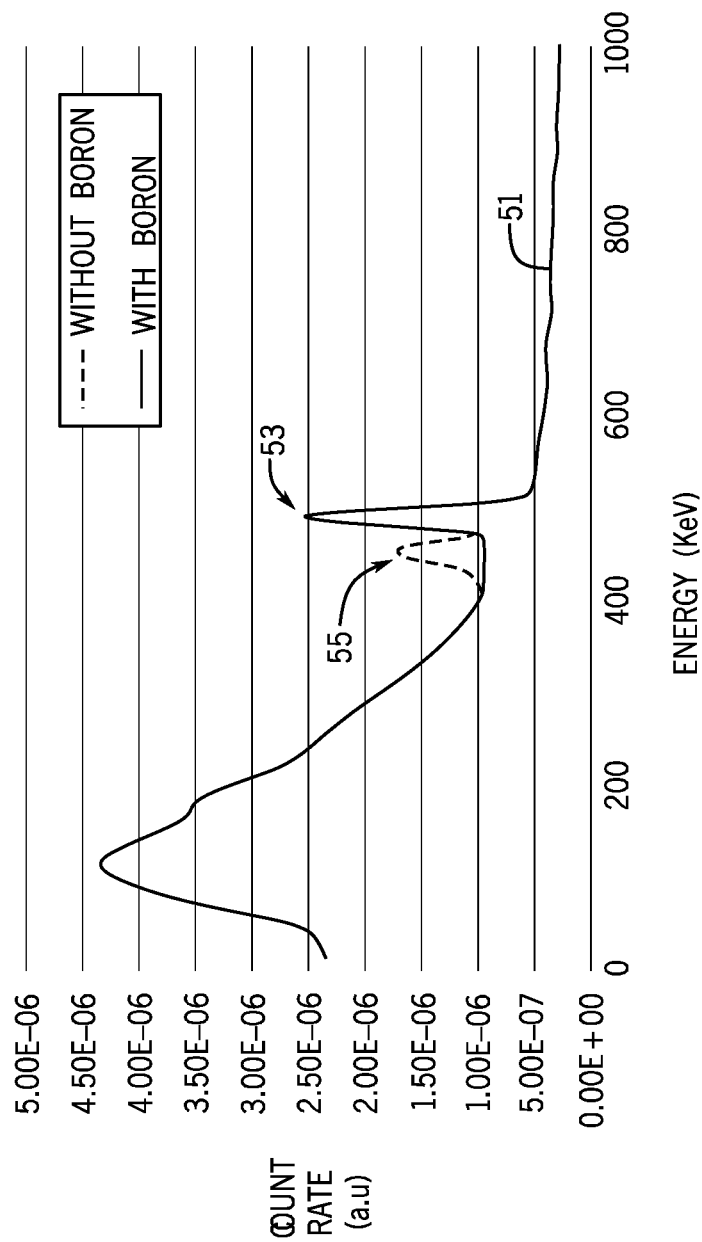
FIG. 5 is a graphical representation of an energy spectrum for spectroscopy with and without boron, in accordance with an embodiment.

FIG. 5 is a graphical representation of an energy spectrum for spectroscopy with and without boron. As illustrated by line 51, an expected peak 53 is formed in the energy spectrum without boron at around 511 kilo electron volts (keV). With the presence of boron, an extra peak 55 would be formed around 478 keV. The presence or absence of a dopant, such as boron, may be used to estimate cement characteristics, as described in detail below.

Estimation of Cement Presence and/or Thickness at Single Depth

Determining the presence or absence of cement may be accomplished via neutron well logging. The cement may have a macroscopic thermal neutron capture cross-section ($\Sigma$) that may be sufficiently different from the drilling mud (e.g., the fluid in place before cement placement), the formation fluid water, oil and/or gas (e.g., fluid present in the annulus section when the wellbore is not cased with cement).

Figure 6:
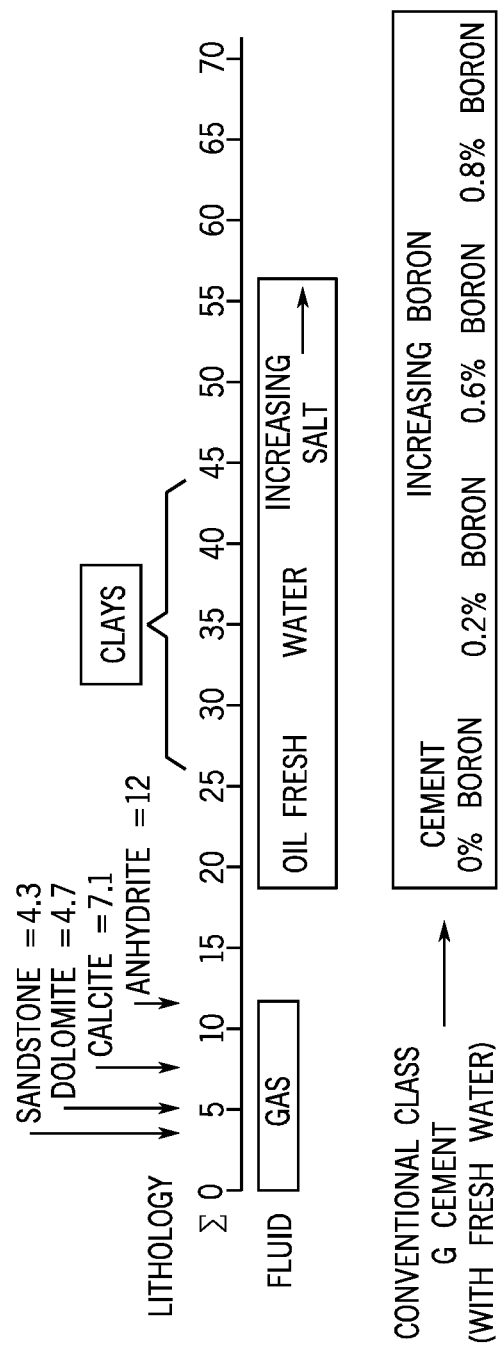
FIG. 6 illustrates a chart depicting various neutron capture cross-sections values of various fluids, in accordance with an embodiment.

In one example, to ensure that the cement has a different thermal neutron capture cross-section ($\Sigma$), a material such as a dopant may be added to the cement slurry. For example, the dopant may include suitable doping materials, such as boron (B) or gadolinium (Gd) that may be added to the cement slurry. It may be appreciated that the quantity of the dopant to be added to the cement slurry may depend on the thermal neutron capture cross-section of the surrounding fluid (e.g., in wellbore 16 or the formation 14) that may be distinguished from cement. Several values of the thermal neutron capture cross-section ($\Sigma$) for various fluids are shown in FIG. 6. The neutron capture cross-section ($\Sigma$) of the cement may be distinguished from various fluids by adjusting (e.g., increasing) the concentration of the neutron absorbing material (e.g., boron) present in the cement.

The transport of neutrons through matter may be influenced by scattering (e.g., elastic and inelastic collisions) and neutron capture. The composition of the material and the energy of the neutrons may affect each process. In a well logging environment, elastic scattering may affect the transport of neutrons. Elastic and inelastic scattering of the nuclei in the material surrounding the neutron source moderates the neutrons, i.e. slows them down to a relatively lower energy, at which they may more readily be detected. As may be appreciated, moderation occurs significantly faster in the presence of hydrogen. Once the neutrons have reached thermal energy, their longevity may primarily be described as a function of the thermal neutron capture cross-section of the formation composition, the cement, the casing 22, and the borehole fluid. The effect of these various neutron interactions may attenuate the number of neutrons passing through the material and back to the one or more neutron detectors 54.

As may be appreciated, more detailed measurements may help provide further insight into the transport of neutrons to gather better well-logging data. The attenuation by the various neutron interactions may be described semi-quantitatively as:

$$N(x) \sim N_0 e^{-\alpha H x} e^{-\beta \rho x} e^{-\Sigma x} \qquad \text{(Eq. 1)}$$

In Equation 1, $N(x)$ may be described as the number of thermal neutrons per second at a given distance x from the source (i.e. a distance travelled in the material), $N_0$ may be described as the number of the source neutron per second, $\alpha$ may be described as the neutron microscopic scattering cross section (except capture) for hydrogen, H may be described as the material hydrogen atom concentration, $\beta$ may be described as the neutron microscopic elastic scattering cross section for elements other than hydrogen, $\rho$ may be described as the material density (atom concentration of other elements), and $\Sigma$ may be described as the macroscopic thermal capture cross-section of the material.

The first term in the equation 1 describes the attenuation (i.e., moderation) due to the hydrogen index of the material surrounding the tool, including the impact of hydrogen in the cement or fluid in the cement annulus. The second term is related to the atom density of the formation 14, with the exception of hydrogen, and the material between the formation 14 and the casing 22, as well as the casing 22 itself and represents the attenuation through elastic and inelastic scattering on materials other than hydrogen and the third term describes the attenuation through the capture of thermal neutrons.

The attenuation or moderation of the high energy neutron flux through inelastic reactions of high-energy neutrons and elastic scattering may be principally related to the density, $\rho$. The factor $e^{-\Sigma x}$ represents the dependence of the response on the thermal neutron capture cross-section of the elements of the material surrounding the downhole neutron tool 26, including hydrogen. The thermal capture may attenuate the number of neutrons at the distance x. In most cases, the neutron capture by an element will result in the emission of one or more gamma rays.

In neutron measurements used in logging applications, the capture of thermal neutrons by oil, fresh water, salty water, and other fluids may be significant. However, by adding an amount of a material (e.g., dopants such as Gd or B) with a high thermal capture cross-section $\Sigma$, information about the presence and local thickness of cement around the casing 22 may be derived. The presence and thickness information regarding the cement may be determined by measuring the die-away time of the thermal neutrons and/or the derived quantity of the thermal capture cross-section $\Sigma$ locally. The measurement of the thermal neutron capture cross section based on neutron detection in the tool has a shallow depth of investigation and is therefore sensitive to capture of neutrons near the tool. The near tool sensitivity may be enhanced by positioning the neutron detector at a short distance (e.g. approximately 6 to 18 in from the source). This may be particularly evident in the presence of significant thermal neutron absorption, which may reduce the migration length of the neutrons.

Another advantage of obtaining more detailed measurements in accordance with the embodiments described herein, includes the ability to utilize azimuthal images of the entire borehole at the same time, which may be used to determine the presence of cement and/or determine the thickness of the cement. As may be appreciated, azimuthal imaging may be achieved by utilizing neutron detectors having azimuthal sensitivity. Azimuthal sensitivity may be achieved by utilizing multiple neutron detectors at the same axial distance from the source and by using collimation to improve imaging. The use of multiple neutron detector in itself results in some degree of collimation. This can be enhanced by strategic placement of neutron absorbing materials near the detectors or, for enhanced azimuthal sensitivity, on the outside or embedded in the tool housing. In other embodiments, one or more azimuthally sensitive neutron detectors may be utilized, as described in U.S. Pat. No. 6,781,115, assigned to Schlumberger Technology Corporation, incorporated by reference herein. Such images may include images from a near thermal detector count rate, a far thermal detector count rate, a ratio of the near and the far thermal detector count rates, a near epithermal detector count rate, far epithermal detector count rate, a ratio of the near and the far epithermal detector count rates, sigma from a near detector, sigma from a far detector, a slowing down time from a near detector, a slowing down time from a far detector, or a combination thereof. It may be appreciated that in order to use count rates from the various radiation detectors 54, it may be helpful to measure the neutron flux from the neutron generators 52 to obtain an accurate flux-normalized count rate.

Figure 7:
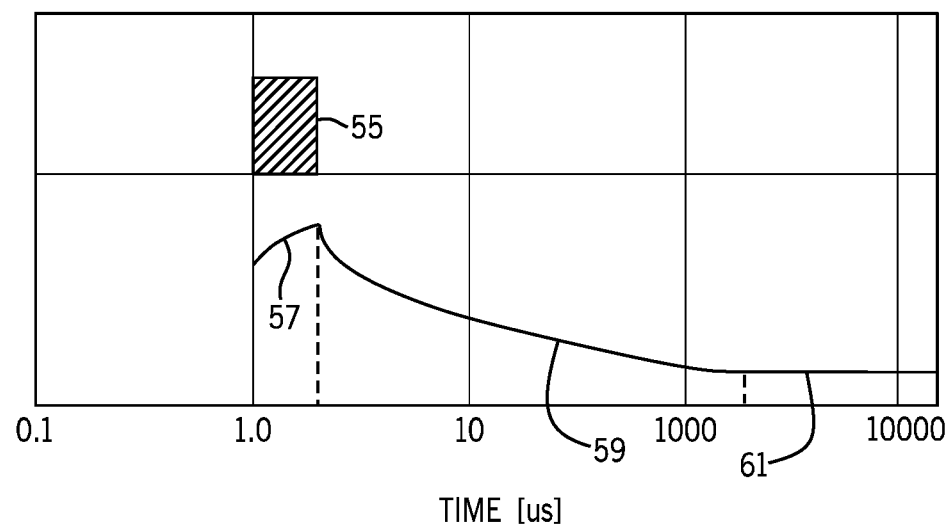
FIG. 7 depicts the variation in the population of neutron induced gamma rays as a function of time after a neutron burst, in accordance with an embodiment.

FIG. 7 depicts the variation in the population of neutron induced gamma rays as a function of time after a neutron burst 55. During the burst 55, gamma rays from inelastic and capture reactions may be observed 57. After the burst, the neutrons are moderated and gamma rays from epithermal and thermal neutron capture 59 are observed until most if not all neutrons have been absorbed by the materials in the tool and surrounding the tool. This takes from about 0.5 ms to several ms depending on the capture cross section of the formation and borehole. If one waits more than about 3 ms, then the only remaining gamma rays 61 come from neutron activation and from natural radioactivity. In this description, gamma rays from inelastic and capture reactions are referred to as prompt gamma rays, while the gamma rays emitted as a consequence of the decay of activation products are called delayed gamma rays.

The observation of gamma rays from activation is another approach to determining the presence and/or quantity of cement behind the casing. In this case, the cement may be "doped" with a material that has a significant probability of emitting activation gamma rays. To be suitable for this kind of measurement, the isotopes in question may need to have a large activation cross section (e.g., either through capture or inelastic neutron interactions and a short decay time typically of the order of seconds to several minutes) to obtain a measurable activation signal. Examples of some suitable isotopes may be found in Table 1 of U.S. Patent Publication 2015/0124921 for a case of activation by an inelastic (n,2n) reaction. In one non-limiting example, activation may also be obtained through neutron capture reactions or various inelastic reactions such as (n,p) or (n,alpha) reactions.

Typical neutron pulsing schemes, as indicated below, allot little time to measuring activation. However, it may be possible to choose a pulse sequence that allows for more time to measure activation. Typically, there may be a sequence of pulses followed by a short capture interval. After a given number of neutron bursts, a longer pause may be selected, during which activation may be observed. As an example, there may be a sequence of 50 20-µs bursts followed by an 80-µs decay interval. This sequence of bursts may be followed by a 10-ms pause. This amounts to a 1-ms on-time for the neutron bursts, 4 ms of short decay intervals and 7 ms (out of the 10 ms pause) for the observation of activation. This means that the neutrons are only on during $1/15^{th}$ of the time. This corresponds to a duty factor of 6.7% for inelastic gamma ray measurements, about 27% of the time for capture gamma ray measurements and about 53% for activation. Since in most cases, the measurement of inelastic and capture gamma rays may have the highest priority, such a timing scheme may not be viable in many applications. More typical timing schemes may only allocate about 5 to 10% of the total time to the determination of activation. Examples of neutron burst sequences can be found in U.S. Pat. No. 6,703,606 assigned to Schlumberger Technology Corporation, incorporated by reference herein.

Typically, activation is observed with a detector that also registers inelastic and capture gamma rays. In this case, there will be an additional contribution from oxygen activation in the borehole and the formation. This can be corrected by either subtracting the O-contribution up front by subtracting an oxygen fraction from the spectrum or the oxygen fraction can be determined through spectral fitting at the same time as the other contributions. Similarly, the contribution from natural gamma ray activity can be subtracted out based on information from a spectral natural gamma ray detector leading the neutron source and unaffected by activation. Alternatively, spectral standards for the naturally occurring elements Th, U and K may be added for the fitting process. As described above, azimuthal or image information may be obtained with a tool having multiple detectors at the same axial position, which are sensitive to a different direction, such as the segmented detector described in U.S. Pat. No. 6,781,115.

Figure 8:
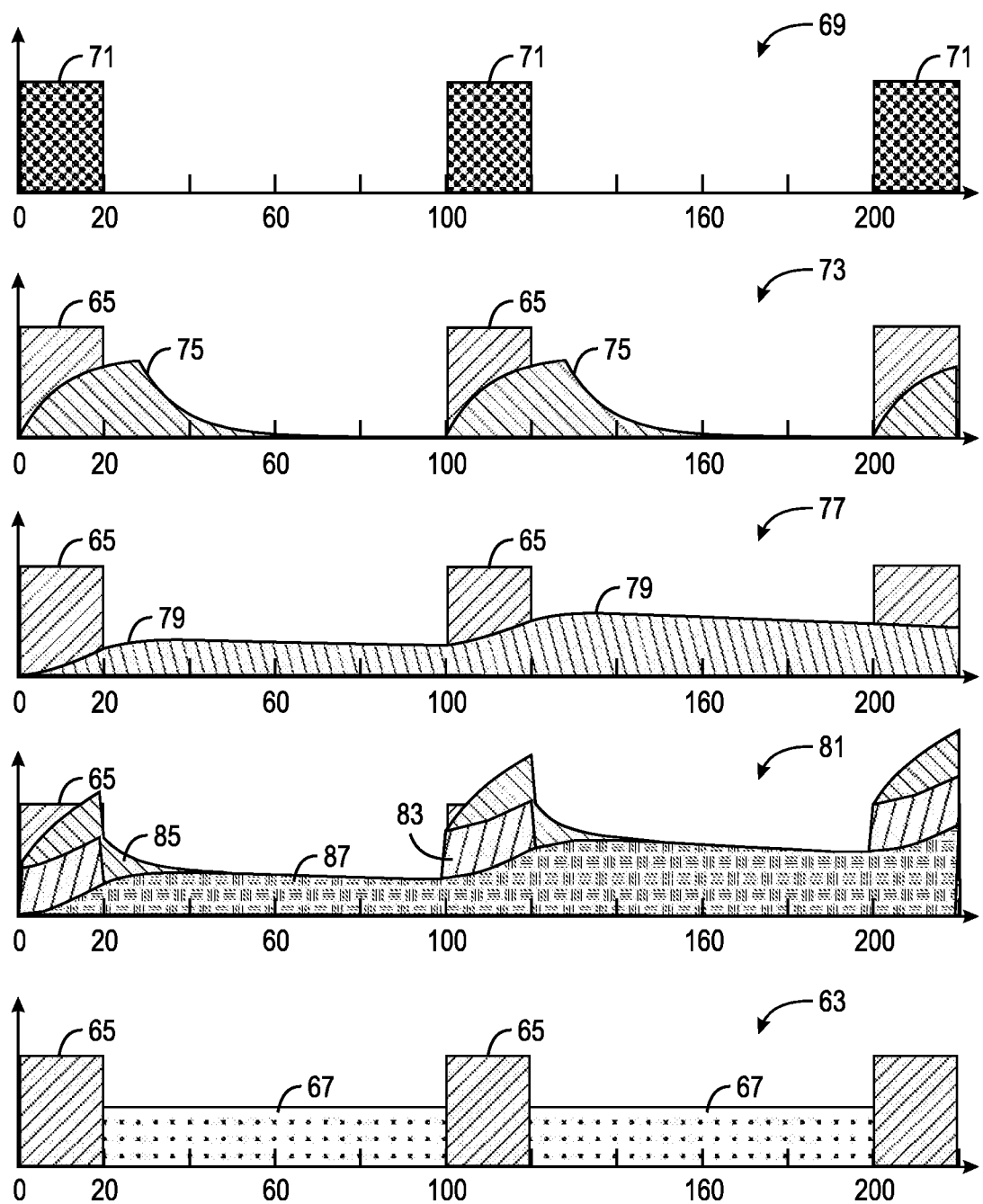
FIG. 8 depicts a neutron burst timing scheme, in accordance with an embodiment.

FIG. 8 depicts a neutron burst timing scheme, which may be used in accordance with the techniques described herein. In each cycle (63), the source neutrons are emitted from 0 to 20 µs (65), followed by an 80-µs waiting time (67). Accordingly, the three top panels 69, 73, 77 of FIG. 8 shows the neutron flux in the formation as function of energy and time, which can be calculated using a simulation. The top panel 69 indicates the fast neutron flux 71 during the neutron burst, which ceases almost immediately at the end of the burst, the second panel 73 shows the epithermal neutron flux 75, which builds up as the fast neutrons slow down to epithermal energies. The third panel 77 represents the thermal neutron flux 79. As can be seen, during the neutron burst 65 from 0 to 20 µs, there are neutrons with energies varying from the source energy to thermal energy. The fast neutrons (indicated by 71) at the MeV energy level have been injected from a 14-MeV source and have not yet been slowed down. The epithermal neutrons (indicated by 75) are those with energy below the MeV level but still above thermal energy. The epithermal neutrons are mainly present during the neutron burst. Right after the burst, there will still be epithermal neutrons but they will relatively quickly slow down to thermal energy. Thermal neutrons (indicated by 79) are present substantially throughout the timing mode and may not disappear before the next neutron burst 65. The capture neutron population will continue to build up until an equilibrium is achieved after several 100 µs. Sometime (for example, 10 µs to 40 µs) after the burst, substantially all the neutrons will be thermalized. There are also thermal neutrons during the burst, some of which are coming from previous bursts. Notably, there is not a visibly identifiably cutoff energy or time (in a multi-channel energy spectrum) to separate the fast, epithermal, and thermal neutrons.

In case the pulsed neutron tool includes gamma ray detectors but not neutron detectors, the tool can measure the prompt gamma rays from neutron interactions either inside or outside the detector, but not the neutrons directly. The bottom panel 83 of FIG. 8 shows an example of a gamma ray time spectrum, which represents the number of gamma rays observed as a function of time with respect to the start of the neutron burst in the timing gate scheme of panel 63 of FIG. 8. There are two mechanisms of gamma ray generation from neutron interactions:

First, fast neutrons can generate prompt gamma rays through inelastic scattering or inelastic reactions, if their energy is higher than the threshold energy of the reaction. Those gamma rays 83 can be detected during the neutron burst, as shown in panel 81 of FIG. 8. The neutron inelastic threshold energy is several MeV for most of the common isotopes found in earth formations.

Second, neutrons can be captured by nuclei and generate gamma rays 85 and 87, which are detected in the detector, as shown in FIG. 8. Generally, the neutron capture probability increases as neutrons slow down to epithermal and thermal energies. Gamma rays 85 due to the capture of epithermal neutrons are generated mainly during the burst and shortly after the burst. Gamma rays 87 from thermal neutron capture can be generated during and after the burst. The capture probability for thermal neutrons may be much higher than for epithermal neutrons. However, if the neutron energy happens to be substantially equal to one of the resonance energies of an isotope, sometimes in the epithermal energy range, the probability for that neutron to be captured by the isotope may be high resulting in a large epithermal capture signal 85.

Figure 9:
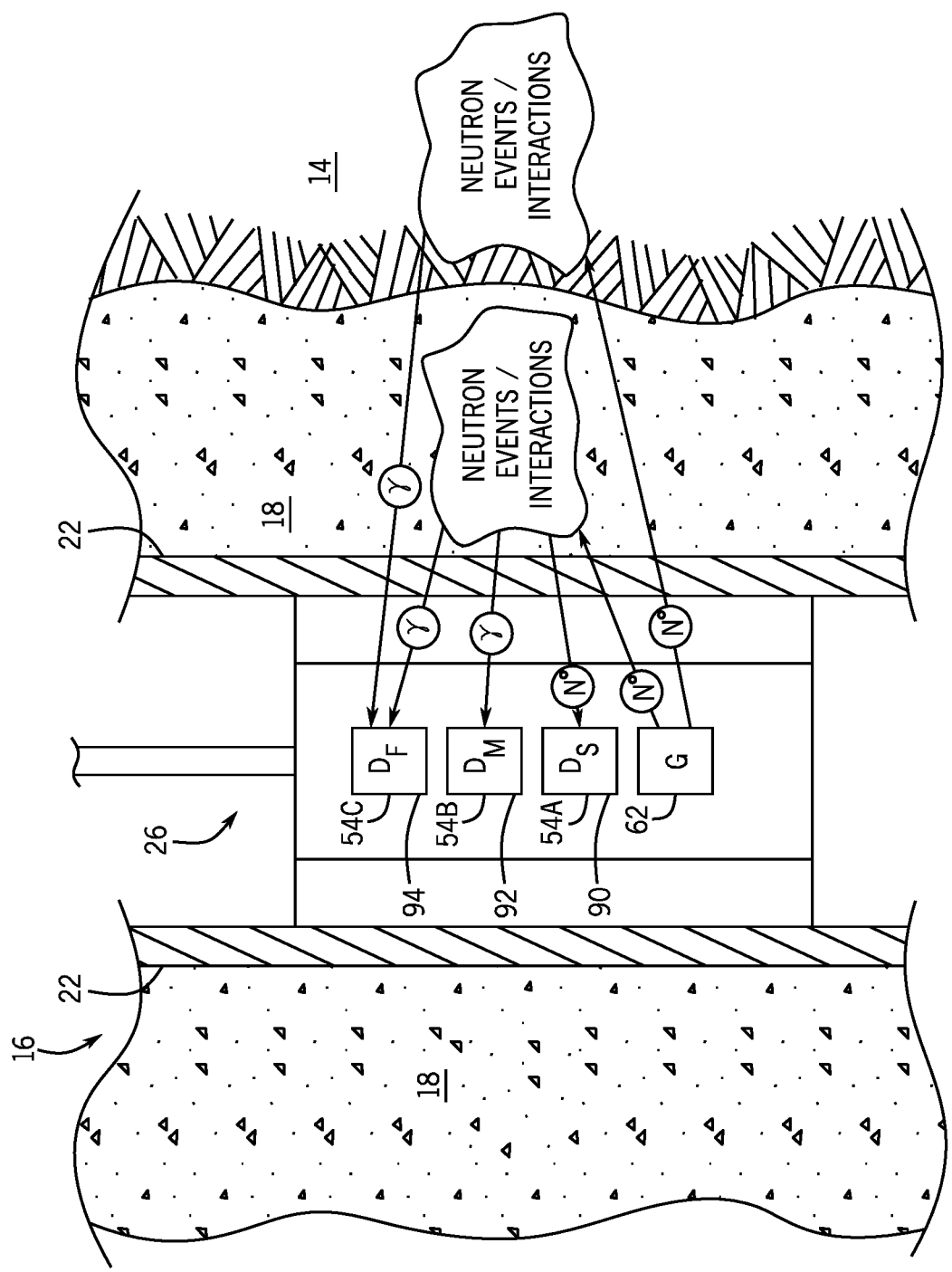
FIG. 9 is a block diagram of the neutron logging tool used to obtain well-logging data relating to material behind casing of the well at various depths, in accordance with an embodiment.

Estimation of Cement Presence and/or Thickness at Varying Depths of Investigation FIG. 9 is a block diagram of the downhole neutron tool 26 used to obtain well-logging data relating to material behind casing 22 of the well at various depths of investigation (DOI), in accordance with an embodiment. The neutron source (e.g., the neutron generator 62) in the downhole neutron tool 26 may emit neutrons out toward the casing 22. As described above, the neutrons may travel to interfaces at the casing 22, the annular fill 18, and the geological formation 14 or an outer casing, respectively. The interactions (e.g., absorption, scattering, collisions, etc.) of the neutrons may vary depending on a hydrogen index of the material surrounding the tool, including the impact of hydrogen in the cement or fluid in the cement annulus. In the illustrated embodiment, the downhole neutron tool 26 utilizes several radiation detectors 54 positioned at varying axial distances from the generator 62 to obtain well-logging data at various depths of investigation. The radiation detectors 54 may detect gamma rays and/or thermal and epithermal neutrons. In the illustrated embodiment, the radiation detectors 54A and 54B may be described as being positioned at a near location 90 and a medium location 92, respectively, relative to the neutron source. The radiation detector 54C may be described as being positioned at a far location 94 relative to the neutron source. Various measurements may be obtained at the varying depths in the wellbore 16 to gain insight into the properties of the material behind the casing 22. In the illustrated embodiment, the radiation detectors 54B, 54C may detect gamma rays, while the radiation detector 54A may detect thermal and epithermal neutrons. The information obtained (e.g., ratios of counts or count rates at different time gates, ratios of spectral yields or derived quantities, etc.) from the neutron and/or gamma detectors at the varying depths of investigation may be used in addition to the techniques previously described to determine the absence or presence of cement and the cement thickness, as described in detail below.

The following non-limiting example may further describe using information obtained from the neutron and/or gamma detectors at the varying depths of investigation. The information obtained is summarized in FIG. 10. To distinguish cement from oil, gas, and fresh water, approximately 0.02% by weight boron may be added to a slurry mixed with fresh water. In the non-limiting example, data was obtained for a thermal capture cross-section Σ of 20 and 80 c. u. (e.g., corresponding to a cement doped with 0.1% of boron). The data was obtained using a 13⅜-in (339.5 mm) surface casing, with a weight of 81.1 kg/m in an open hole of 529 mm and a 7-in (177.8 mm) production casing, with a weight 38.7 kg/m, in an open hole of 223 mm. The cement thickness varied in the range of 10-60 mms. The formation was assumed to be limestone with 10% porosity. For each radiation detector 54, a time spectrum was predicted with a suitable simulator (e.g., Monte Carlo simulations) using the various configurations. A late count was measured and may be described as the count value after 200 microseconds (μs), while the total time was also tracked.

It may be appreciated that the far/near late count ratio may be considered the most sensitive parameter to detect the difference between boron-doped cement (Σ~80) and other fluids in the annulus (Σ~20). To compensate for the influence of the formation and to determine the width of cement sheath, the far/medium ratio may be considered. In a non-limiting example, the thickness of the cement may be predicted by utilizing the following relationship.

Figure 11:
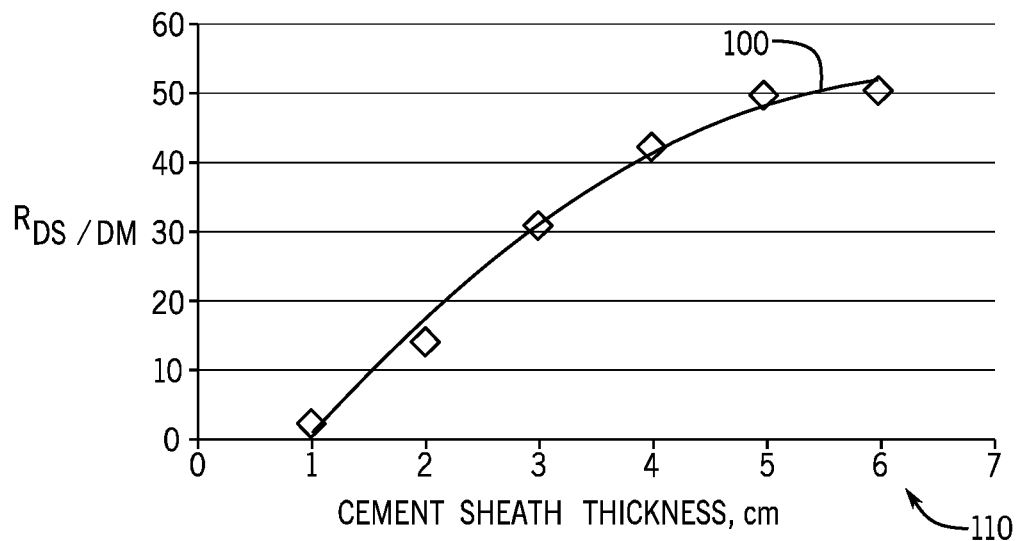
FIG. 11 is plot illustrating a relationship between the cement thickness and a ratio between the late count obtained for a far detector and a near detector and the ratio between the time integral of the counts obtained for the far detector and a medium detector, in accordance with an embodiment.

The following parameter, $R_{DS/DM}$, may be defined as:

$$R_{\frac{DS}{DM}} = \frac{\frac{Deep}{Shallow_{Late}}}{\left(\frac{Deep}{Medium_{Total}}\right)^3}$$

where $$\frac{Deep}{Shallow_{Late}}$$

is the ratio between the late count obtained for the deep (far) detector 54C and the near detector 54A and $$\frac{Deep}{Medium_{Total}}$$

is the ratio between the time integral of the count obtained for the deep (far) detector 54C and the medium detector 54B. This $R_{DS/DM}$ parameter may be used to predict cement thickness, as shown in plot 110 in FIG. 11. As may be appreciated, spectroscopic measurements may be used to increase the resolution of the data logs obtained. The sensitivity of the ratio $R_{DS/DM}$ to the cement thickness shown in curve 100 in FIG. 11 may be adjusted by changing the spacing of the near detector 54A from the neutron source. The sensitivity to the cement thickness may also be adjusted by changing the nature of the near radiation detector 54A such that the near neutron radiation detector 54A is replaced by a gamma ray detector for larger cement thicknesses. It should be noted that other detector count rate ratios using different time gates may be more suitable in some cases.

Figure 12:
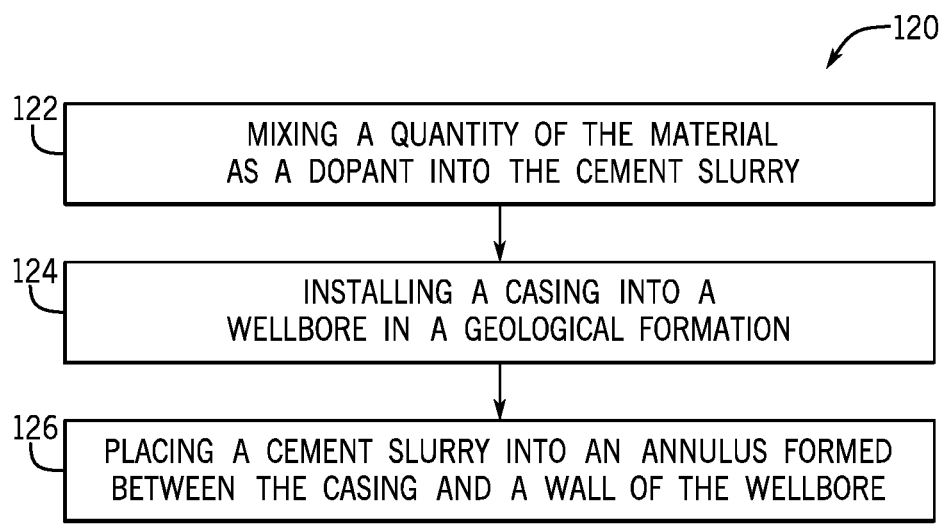
FIG. 12 illustrates a flowchart of a method for installing the casing into the wellbore in the geological formation, in accordance with an embodiment.
Figure 13:
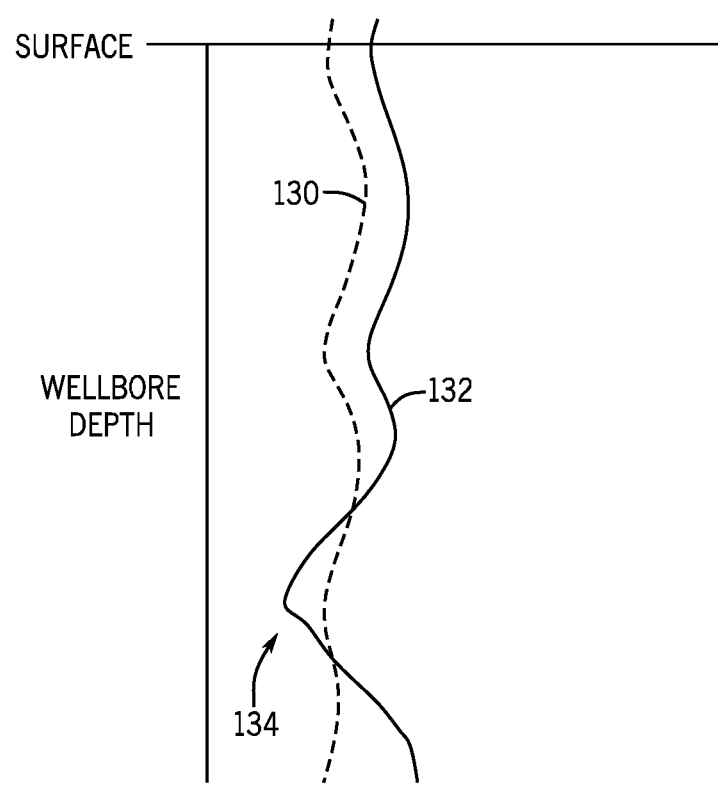
FIG. 13. illustrates a log generated using the well-logging data to analyze characteristics of the cement, in accordance with an embodiment.

The techniques described above may be used to adjust the amount and type of material used in the cement that is installed around the casing 22 for future operations or other sites, as described further with reference to FIGS. 12-13. FIG. 12 illustrates a method 120 for installing the casing into the wellbore 16 in the geological formation 14. The method 120 includes adding or mixing (block 122) a quantity of a specific material (e.g., dopant) that has suitable nuclear properties into the cement slurry. The method 120 includes installing (block 124) the cement casing into the wellbore 16 in the geological formation 14. The method 120 may further include placing (block 126) the cement slurry into the annulus formed between the casing 22 and the inner wall of the wellbore 16.

FIG. 13 illustrates one type of log (e.g., graphical comparison) generated using the well-logging data to depict the quality of the cement operations. As described above, the determination of the thickness of the annular fill 18 may utilize pre-fill measurements 130 taken via calipers or other suitable tools to measure the wellbore cross section at varying depths, where post-fill measurements are based on the previously indicated parameter $R_{DS/DM}$. The pre-fill measurements 130 may then be compared to post-fill measurements 132 after the annular space is filled with cement. The pre-fill and post-fill measurements 130, 132 may be used to determine whether the thickness of the cement is a suitable thickness, detect abnormalities in the cement, and/or make adjustments to the cementing operations. For example, a location 134 may indicate an abnormality in the cement where the cement does not meet a specific cement criterion (e.g., thickness, etc.).

Therefore, in a first embodiment utilizing at least three gamma ray detectors, the presence of a sufficient amount of cement maybe based on the use of $R_{DS/DM}$, wherein a cement thickness is determined based on the parameter $R_{DS/DM}$ and the known response of this parameter to changes in formation properties, so that the ratio 130 can be predicted based on known formation parameters and tool response, and compared to the measured ratio 132. In its basic form, this embodiment utilizes only count rates measured during one or more pre-defined time intervals and their ratios for the cement quality assessment if the formation properties and the borehole size are known. It may be appreciated that doping the cement with a neutron absorber may allow a more accurate depiction, as the deep/shallow$_{late}$ ratio will be affected more by the presence of the thermal neutron absorbing dopant than the deep/medium$_{total}$ ratio.

In a second embodiment, the cement quality assessment is based on the same three-detector tool. For each of the detectors, an apparent thermal neutron capture cross-section ($\Sigma$) is determined. Given the difference in spacing of the detectors, this embodiment utilizes different depths of investigation. The depth of investigation increases with an increase in detector spacing. The presence and quality of the cement can be based on the comparison of the apparent thermal neutron capture cross-section $\Sigma$ of the three detectors in one or more predefined time intervals after the neutron burst. For this approach, it may be necessary to use a pulse timing, which allows a longer decay time after the burst. This can be achieved by having a sequence of short bursts followed by a longer pause (e.g., about 250 to 1000 µs), during which a more accurate determination of the thermal neutron decay constants is possible. While knowledge of a borehole caliper from open hole measurements may improve accuracy, the method described herein will work even in the absence of open hole data. Doping the cement with a neutron absorber, will allow a more unique and accurate answer because the apparent sigma of the near detector will be affected more strongly. The responses based on ratios and apparent sigma values may be combined to obtain a more accurate and unique answer.

In a third embodiment, one or more of the detectors are neutron detectors and preferably at least one of the detectors is a gamma ray detector. In the preferred approach, the near detector may be a thermal neutron detector, while the at least one other detector is a gamma ray detector. Due to the fact that thermal neutrons are detected, the depth of investigation is shallower, in particular if the detector is near the neutron source. For this configuration, one can either use the ratio-based approach or, preferably, the apparent thermal neutron capture cross-section ($\Sigma$) based approach to determine the presence or absence of doped cement.

In a yet another embodiment, at least one of the gamma ray detectors may be a spectroscopy detector that can acquire the spectrum of the detected gamma rays. In this case, the presence or absence of cement may be based entirely or in part on the analysis of the induced gamma ray spectrum. The contribution of gamma rays from the material doping the cement may be analyzed and based on this the presence or absence of cement can be assessed. The analyzed gamma ray spectra may be either inelastic gamma ray spectra from materials with a large inelastic scattering cross section and a unique gamma ray signature, gamma rays from capture in one or more materials with a large neutron capture probability and a unique capture gamma ray signature added to the cement or gamma rays from the activation of a material added to the cement that has a large activation cross section and a short decay time as outlined above. The analysis of the relative or absolute (with respect to the neutron output) contribution of the gamma rays from the doping may provide an estimate of the quality of the cement. This method may be combined with the measurement of apparent thermal neutron capture cross-section ($\Sigma$) is and the count rate ratios mentioned above.

In yet another embodiment, one or more of the measurements above are made for two or more azimuths around the tool. This may be accomplished by one or more of the detectors having azimuthal sensitivity or by using one or more detectors at the same axial distance having sensitivity to a different azimuth (e.g., the near detector could be split into four or more neutron detectors facing different directions in order to preferentially sensitive to a given azimuth.) In this approach, the tool is preferably centered in the casing to avoid artifacts from unequal azimuthal sensitivity due to one or more detectors being closer to the casing and cement than other detectors.

This arrangement may be used to obtain an azimuthal response if at least one of the detectors used for the ratio determination (e.g., preferably the near detector) is azimuthally sensitive. The same is true for the measurement of the apparent thermal neutron capture cross-section ($\Sigma$), given that the near detector and, in particular near neutron detectors, have a shallow depth of investigation. It may be appreciated that gamma ray spectroscopy with azimuthal sensitivity is possible. However, the small possible size of the azimuthal detectors will affect the spectral quality. A good measurement should be possible if the dopant is boron. Measurement of activation products is generally also easier as the energies of activation gamma rays are typically lower than those of capture or inelastic gamma rays.

Those skilled in the art may realize that the above described measurements can be used as stand-alone measurements or in conjunction with each other and that additional embodiments are possible, in which the response is based on count rates of one or more detectors and not the ratio of such count rates, as long as the neutron output of the generator is known. Modeling maybe used to predict the expected results and comparison of measurement and model may allow a more accurate assessment of the quality of the cement.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for evaluating cement in a cased wellbore in a geological formation, the method comprising:

placing a downhole tool into the cased wellbore, wherein the cased wellbore has been cased using a cement that contains a particular material;

emitting neutrons using the downhole tool, wherein the neutrons interact with an environment of the wellbore including the geological formation and the particular material, wherein the neutrons:

interact via inelastic scattering or capture of neutrons with the particular material resulting in the emission of prompt gamma ray radiation, wherein an energy spectrum of the prompt gamma ray radiation is characteristic of the particular material and/or cause activation of the particular material resulting in the delayed emission of gamma ray radiation, wherein an energy spectrum of the delayed gamma ray radiation is characteristic of the activated particular material; and using the downhole tool to measure the gamma ray radiation, wherein measuring the radiation comprises:

detecting a first radiation signal representing radiation detected at a first depth of investigation using a first radiation detector;

detecting a second radiation signal representing radiation detected at a second depth of investigation greater than the first depth of investigation using a second radiation detector; and detecting a third radiation signal representing radiation detected at a third depth of investigation greater than the second depth of investigation using a third radiation detector;

wherein the measurement of radiation enables a thickness of the cement to be estimated based at least in part on a relationship between the first radiation signal, the second radiation signal and the third radiation signal, wherein the relationship is the following:

$$R_{\frac{DS}{DM}} = \frac{\frac{Deep}{Shallow_{Late}}}{\left(\frac{Deep}{Medium_{Total}}\right)^3}$$

wherein $$\frac{Deep}{Shallow_{Late}}$$

is a ratio between a late count of the third radiation signal and the first radiation signal and $$\frac{Deep}{Medium_{Total}}$$

is a ratio between a time integral of a count of the third radiation signal and of the third second radiation signal, wherein a late count is a count after 200 microseconds.

2. The method of claim 1, comprising generating a well log illustrating an estimate of a thickness of the cement over well depth based at least in part on the detected radiation.

3. The method of claim 1, comprising generating an azimuthal image illustrating an image of the entire borehole.

4. A downhole logging system, comprising:

a downhole neutron tool configured to be moved into a wellbore in a geological formation, wherein the downhole acquisition tool comprises:

one or more neutron generators for emitting neutrons into the formation;

one or more radiation detectors, each configured to perform a measurement of radiation including a measurement of an energy spectrum of the radiation, wherein the radiation includes prompt gamma ray radiation resulting from interaction with neutrons via inelastic scattering or capture of neutrons delayed gamma ray radiation resulting from activation of the environment of the tool; and one or more non-transitory, tangible computer-readable media storing instructions to:

receive one or more measurements of radiation obtained by the downhole neutron tool over a depth interval of a well, wherein the one or more measurements of radiation are measurements of:

a first radiation signal representing radiation detected at a first depth of investigation using a first radiation detector; and a second radiation signal representing radiation detected at a second depth of investigation greater than the first depth of investigation using a second radiation detector;

a third radiation signal representing radiation detected at a third depth of investigation greater than the second depth of investigation using a third radiation detector;

estimate a thickness of cement surrounding a casing in the depth interval of the well based on the one or more measurements of radiation based at least in part on a relationship between the first radiation signal, the second radiation signal and the third radiation signal, wherein the relationship is the following:

$$R_{\frac{DS}{DM}} = \frac{\frac{Deep}{Shallow_{Late}}}{\left(\frac{Deep}{Medium_{Total}}\right)^3}$$

wherein $$\frac{Deep}{Shallow_{Late}}$$

is a ratio between a late count of the third radiation signal and the first radiation signal and $$\frac{Deep}{Medium_{Total}}$$

is a ratio between a time integral of a count of the third radiation signal and of the third second radiation signal, wherein a late count is a count after 200 microseconds.

5. A method for evaluating cement in a cased wellbore in a geological formation, the method comprising:

placing a downhole tool into the cased wellbore, wherein the cased wellbore has been cased using a cement that contains a particular material;

emitting neutrons using the downhole tool, wherein the neutrons interact with an environment of the wellbore including the geological formation and the particular material, wherein the neutrons:

interact via inelastic scattering or capture of neutrons with the particular material resulting in the emission of prompt gamma ray radiation, and/or cause activation of the particular material resulting in the delayed emission of gamma ray radiation; and using the downhole tool to:

detect a first radiation signal representing thermal neutrons using a neutron detector at a first depth of investigation;

detect a second radiation signal representing gamma rays detected at a second depth of investigation greater than the first depth of investigation using a first gamma ray detector; and detecting a third radiation signal representing gamma rays detected at a third depth of investigation greater than the first depth of investigation and the second depth of investigation using a second gamma ray detector, determining a first, second and third die-away patterns of the respective first, second and third radiation signals determining a thickness of the cement by comparing the first, second and third die-away patterns.

6. A downhole logging system, comprising:

a downhole neutron tool configured to be moved into a wellbore in a geological formation, wherein the downhole acquisition tool comprises:

one or more neutron generators for emitting neutrons into the formation;

one or more radiation detectors, each configured to perform a measurement of radiation including a measurement of a die-away pattern of a radiation signal obtained from the detector, wherein the one or more detectors include at least:

a neutron detector having a first depth of investigation;

a first gamma ray detector having a second depth of investigation greater than the first depth of investigation; and a second gamma ray detector having a third depth of investigation greater than the first depth of investigation and the second depth of investigation one or more non-transitory, tangible computer-readable media storing instructions to:

receive measurements of radiation obtained by the neutron detector, first gamma ray detector and second gamma ray detector over a depth interval of a well;

determining a first, second and third die-away patterns of the respective first, second and third radiation signals; and determine a thickness of cement surrounding a casing in the depth interval of the well by comparing the first, second and third die-away patterns.

* * * * *